United States Patent [19]

Becker et al.

[11] Patent Number: 4,668,444
[45] Date of Patent: May 26, 1987

[54] PROCESS FOR THE PRODUCTION OF ISOTROPHIC SPHERICAL FUEL OR ABSORBER ELEMENTS FOR HIGH TEMPERATURE REACTORS

[75] Inventors: Hans-Joachim Becker, Freigericht; Werner Heit, Linsengericht; Hans Huschka, Hanau; Wilhelm Rind, Freigericht, all of Fed. Rep. of Germany

[73] Assignee: Hobeg mbH, Hanau, Fed. Rep. of Germany

[21] Appl. No.: 772,396

[22] Filed: Sep. 4, 1985

[30] Foreign Application Priority Data

Sep. 29, 1984 [DE] Fed. Rep. of Germany ....... 3435863

[51] Int. Cl.$^4$ .............. G21C 21/02; G21C 3/02; C09K 11/04
[52] U.S. Cl. .................. 264/0.5; 252/637; 252/639; 264/57; 264/60; 264/63; 264/65; 376/411; 376/412; 376/414; 376/419; 427/6
[58] Field of Search ............ 264/0.5, 56, 60, 63, 264/125, 57, 65; 427/5, 6; 252/637, 636, 639, 638, 643; 376/411, 419, 414, 412, 339; 423/11, 15

[56] References Cited

U.S. PATENT DOCUMENTS

| | | | |
|---|---|---|---|
| 3,978,177 | 8/1976 | Huschka et al. | 264/0.5 |
| 4,022,663 | 5/1977 | Hrovat et al. | 376/411 |
| 4,045,526 | 8/1977 | Iwamoto et al. | 264/0.5 |
| 4,134,941 | 1/1979 | Hrovat et al. | 252/639 |
| 4,140,738 | 2/1979 | Hrovat et al. | 264/0.5 |

FOREIGN PATENT DOCUMENTS

| | | | |
|---|---|---|---|
| 1158641 | 12/1963 | Fed. Rep. of Germany | 264/0.5 |
| 1812726 | 9/1967 | Fed. Rep. of Germany | 264/0.5 |
| 1909871 | 9/1970 | Fed. Rep. of Germany | 264/0.5 |
| 2601767 | 7/1976 | Fed. Rep. of Germany | 264/0.5 |
| 1301880 | 1/1973 | United Kingdom | 264/0.5 |

Primary Examiner—Stephen J. Lechert, Jr.
Assistant Examiner—Howard J. Locker
Attorney, Agent, or Firm—Cushman, Darby & Cushman

[57] ABSTRACT

Substantially isotropic spherical fuel and absorber elements for high temperature reactors are produced by molding corresponding fuel particles and graphite molding compositions. There is used as graphite molding powder a mixture of graphitized granules of coke and a hardenable resin binder. There are first produced in steel dies at 80° to 120° C. half shells and a nucleus with a pressed density of 1.0 to 1.4 g/cm$^3$ followed by molding in a further steel die to the final format.

11 Claims, No Drawings

PROCESS FOR THE PRODUCTION OF ISOTROPHIC SPHERICAL FUEL OR ABSORBER ELEMENTS FOR HIGH TEMPERATURE REACTORS

BACKGROUND OF THE INVENTION

The invention is directed to a process the production of substantially isotropic, spherical fuel or absorber elements of higher strength for high temperature reactors by pressing a mixture of graphite molding powder containing binder resin with coated nuclear fuel or absorber particles to form a spherical nucleus, pressing a shell made of the same graphite molding powder, carbonizing the binder resin and vacuum calcining up to about 2000° C.

Spherical fuel or absorber elements for high temperature reactors consist of a spherical ball nucleus, in which the nuclear fuel or the absorber material is present in the form of coated nuclear fuel or absorber particles, embedded in a graphitic matrix, as well as an outer fuel or absorber free shell which encloses these spherical nuclei and is made of the same material as this graphitic matix.

The elements are produced by molding as is described e.g. in German Pat. No. 1909871 whereby first the spherical nucleus is preliminarily molded from a mixture of so-called graphite molding powder and the coated particles and subsequently using this graphite molding powder the fuel or absorber free shell is molded on this nucleus. Subsequently the binder of the graphite molding powder is carbonized.

It is required of spherical fuel or absorber elements that the physical or mechanical properties of the matrix graphite are substantially isotropic. As a measure for a possible anisotropy there is defined customarily the quotient of the thermal coefficient of expansion measured parallel and perpendicular to specific preferred directions. Such anisotropy is produced because graphite normally is a highly anisotropic material because of its crystal structure, which only shows macroscopic isotropic properties if there is produced a random statistical distribution of the graphite granules of the crystallites.

Insofar as they are not carried out most substantially isostatically, molding processes represent particularly techniques which can lead to a preferred orientation of the graphite granules corresponding to the preferred direction of the molding process and thus to a significant anisotropy of the molded body produced.

This state of affairs, anisotropic properties of the graphite particles on the one hand and the requirement of isotropic properties of the elements produced from these graphite granules on the other hand has led to the molding of spherical fuel or absorber the elements today exclusively by nearly isostatic molding procedures. Thereby the spherical nucleus if preliminarily pressed in an elastic mold, as a rule made of silicone rubber material, likewise the shell is molded in a mold which likewise normally consists of silicone rubber. Through their elasticity these molds cause a preeminently radial distribution of pressure and therefore in the molding lead to the desired statistical distribution of the graphite granules so that the resulting molded article exhibits the most nearly isotropic properties.

On the other hand, the use of those molded shapes constrains the molding process to be carried out a lower temperatures, as a rule at room temperature because of insufficient temperature resistance, through which high molding pressure are required.

In order to prevent the danger of the decomposition of the coated particles arising at high molding pressures there are necessary expensive encasing processes such as described e.g. in German Pat. No. 1909871 or specially constructed molding compositions such as described, e.g. in German Pat. No. 2348282 (and related Huschka U.S. Pat. No. 3,978,177, the entire disclosure of which is hereby incorporated by reference and relied upon). Furthermore, the high molding pressure limits the life of the compression mold. Independent of these problems related to the molding pressures it is necessary to shape the surface of the spherical nucleus in order that there is formed a sufficient bond between the spherical nucleus and the pressed on spherical shell which prevents the spherical shell from spalling from the spherical nucleus either during the necessary concluding heat treatment step of the fuel or absorber element, i.e., the necessary coking of the binder and a subsequent purification and degassing, or during the mechanical stress in the reactor operation. This shaping of the spherical nucleus surface, however, requires complicated molding tools.

Therefore, it was the problem of the present invention to develop a process for the production of substantially isotropic, spherical fuel or absorber elements of high strength for high temperature reactors by molding a mixture of graphite molding powder containing a binder resin with coated nuclear fuel-or absorber particles to form a spherical nucleus, pressing on a shell made of the same graphite molding powder, carbonizing the binder resin and vacuum calcining up to about 2000° C. whereby there should be eliminated elastic compression molds, a special shaping of the spherical nucleus should be unnecessary and should be preliminary molded at higher temperatures.

SUMMARY OF THE INVENTION

This problem was solved according to the invention by using as the graphite molding powder a mixture of graphitized coke granules having substantially isotropic properties and a hardenable resin binder, that first from thus molding powder there is preliminarily pressed at 80° to 120° C. two ellipsoid shaped shell halves successively in a first cylindrical steel molding die having a smooth ellipsoidal hollowing of the lower die and a smooth ellipsoidal shaped front surface of the upper die adjusted to it, that subsequently there is preliminarily pressed from this mixture of the graphite molding powder and coated particles likewise at 80° to 120° C. in a second steel molding die which also has smooth surfaces an related to the shell halves appropriately elliposida shaped spherical nucleus whereby the density of the graphite matrix in the preliminarily pressed nucleus and in the preliminarily pressed shell halves must be between 1.0 and 1.4 grams/cm³, that then the nucleus and the two shell halves are put together to form an ellipsoidally shaped body and that finally this body is finally molded in the plastic temperature range of the resin binder to the final composition in known manner in a third steel molding die having hemispherically shaped hollowed and upper and lower dies.

Preferably, there is used as graphite powder soft coal secondary pitch coke and it is preliminarily pressed so that the density of the preliminary pressed portions is between 1.1 and 1.3 g/cm³. Furthermore, it is advantageous to so regulate the temperature in the final molding process to the final composition that the resin binder is hardened in the molding die and the final molded sphere or ball can be ejected at the molding temperature. Besides it has proven good to preheat the preliminarily pressed portions to a temperature slightly below the final molding temperature and to insert it into the likewise preheated compression mold, whereby the final molding is carried out advantageously with a floating matrix.

It has been surprisingly found that by using isotropic graphite raw material such as e.g. soft coal secondary pitch coke the molding process can be controlled in such manner that it is not necessary to shape the surface of the spherical nucleus but that exclusively smooth molding tools can be used if the density of the preliminary pressed portions is within the mentioned range between 1.0 and 1.4 g/cm$^3$. Furthermore, it has been found that by using this graphite molding powder elements of sufficient isotropy can also then be attained if the molding process is carried out anisotropic dimensionally in steel dies. A particularly simple temperature guide for the molding process results from the use of hardenable resin binders. A temperature in the plastic range of the resin binder (about 100° C.) thin is sufficient to reduce the molding pressure to such an extent that there can be eliminated an encasing of the particles as in German Pat. No. 1909871 or special molding compositions as in German Pat. No. 23482821 or the related Huschka U.S. Pat. No. 3,978,177 to prevent damages to the coated particles brought about by the molding process. The pressing in steel dies having smooth surfaces furthermore offers the advantage that there can be eliminated an otherwise customary mechanical subsequent treatment of the elements to produce an exact spherical shape.

The following example explains the process of the invention in more detail.

The process can comprise, consist essentially of or consist of the stated steps with the recited materials.

Unless otherwise indicated all parts and percentages are by weight.

DETAILED DESCRIPTION

EXAMPLE

Isotropic graphitized soft coal secondary pitch coke powder was treated with phenol formaldehyde in the ratio of 4:1 to 6:1, there was added to the resin between 3 and 10 weight percent of hexamethylenetetramine as hardening agent. Half shells having a green density of about 1.2 g/cm$^3$ were preliminary pressed from the thus produced molding powder at elevated temperature (about 100° C.). A further portion of the molding powder was mixed with coated particles and preliminarily pressed to spherical nuclei having a green density of likewise about 1.2 g/cm$^3$ (based on the molding powder components).

The preliminarily pressed portions were preheated to about 80° C., assembled in the final mold matrix and final molded, whereby to harden the binder the temperature of the charge was increased up to 170° C. After the final molding the elements were carbonized in known manner and finally calcined in a vacuum at temperatures up to 2000° C.

The elements thus produced on the average exhibited higher crush strengths than the conventionally produced elements. In the case of using floating matrices the anistropy of the elements defined as the quotient of the linear thermal coefficient of expansion parallel and perpendicular to the molding direction is about 1.2 and accordingly within the band width of the elements conventionally produced by quasiisostatic molds.

It is not necessary to encase the coated particles during the molding process to avoid particle damage with these elements.

What is claimed is:

1. In a process for the production of a substantially isotropic spherical fuel or absorber element of high strength for a high temperature reactor by molding a mixture of graphite molding powder containing a resin binder with coated nuclear fuel or absorber particles to a spherical nucleus, pressing on a shell of the same graphite molding powder, carbonizing the resin binder and vacuum calcining at a temperature up to about 2000° C., the improvement comprising employing as the graphite molding powder a mixture of graphitized coke particles having substantially isotropic properties and a hardenable binder resin, first preliminarily pressing from this graphite molding powder at 80° to 120° C. two ellipsoidally shaped shell halves successively in a first cylindrical steel molding die having a smooth ellipsoidal hollowing of the lower die and a smooth ellipsoidally shaped front surface of the upper die adjusted to it, also preliminarily pressing from another portion of the graphite molding power and coated particles likewise at 80° to 120° C. in a second steel molding die which also has smooth surfaces and relative to the shell halves, appropriately ellipsoidally shaped spherical nucleus whereby the pressing is to such an extent that the density of the graphite matrix in the preliminarily pressed nucleus and in the preliminarily pressed shell halves is between 1.1 and 1.4 g/cm$^3$, then putting together the nucleus and the two shell halves to form an ellipsoidally shaped body and finally completing the molding in the plastic temperature range of the resin binder to form a final sphere and removing it from the mold.

2. A process according to claim 1 wherein there is employed graphitized soft coal secondary pitch coke as the graphite powder and that the density of the preliminary pressed portions is between 1.1 and 1.3 g/cm$^3$.

3. A process according to claim 2 wherein the resin binder is hardened in the molding die in the final molding process and the molded body is discharged from the die at molding temperature.

4. A process according to claim 1 wherein the resin binder is hardened in the molding die in the final molding process and the molded body is discharged from the die at molding temperature.

5. A process according to claim 4 including the step of preheating the preliminarily pressed portions to a temperature just below the final molding temperature and inserting it in the preheated mold.

6. A process according to claim 3 including the step of preheating the preliminarily pressed portions to a temperature just below the final molding temperature and inserting it in the preheated mold.

7. A process according to claim 2 including the step of preheating the preliminarily pressed portions to a temperature just below the final molding temperature and inserting it in the preheated mold.

8. A process according to claim 1 including the step of preheating the preliminarily pressed portions to a temperature just below the final molding temperature and inserting it in the preheated mold.

9. A process according to claim 8 comprising carrying out the final molding in a floating matrix.

10. A process according to claim 5 comprising carrying out the final molding in a floating matrix.

11. A process according to claim 1 comprising carrying out the final molding in a floating matrix.

* * * * *